United States Patent [19]

James et al.

[11] Patent Number: 4,887,385
[45] Date of Patent: Dec. 19, 1989

[54] CONNECTING MEANS FOR FRANGIBLE AND/OR FRIABLE ARTICLES

[75] Inventors: Barry D. James; Herbert W. James, both of Sambourne, England

[73] Assignee: James Naylor Limited, Worcestershire, England

[21] Appl. No.: 129,654

[22] Filed: Dec. 7, 1987

[30] Foreign Application Priority Data

Dec. 12, 1986 [GB] United Kingdom ............... 8629788

[51] Int. Cl.⁴ .............................................. A01G 5/00
[52] U.S. Cl. ................................................. 47/41.12
[58] Field of Search ................. 47/41.12, 41 R, 41 G, 47/41 SS, 41.1, 41.11, 41.13; 411/340, 341, 343, 389, 392

[56] References Cited

U.S. PATENT DOCUMENTS

| 71,909 | 12/1867 | Pierce | 411/389 |
|---|---|---|---|
| 311,883 | 2/1885 | England | 411/389 |
| 375,907 | 1/1888 | Whitmore | 411/389 |
| 510,523 | 12/1893 | Smith | 47/47 |
| 1,631,631 | 6/1927 | Gerlinger | 47/41.12 |
| 2,601,658 | 6/1952 | Bussert | 47/41.12 |
| 2,759,285 | 8/1956 | Bussert | 47/41 |
| 3,148,480 | 9/1964 | Gallo | 47/41.12 |
| 3,208,701 | 9/1965 | Erickson | 47/41 |
| 3,368,303 | 2/1968 | Tong | 47/41.12 |
| 3,630,811 | 12/1971 | Radus | 47/41.12 |
| 4,204,365 | 5/1980 | Hirvi | 47/41.12 |
| 4,566,221 | 1/1986 | Kossin | 47/41.13 |
| 4,762,453 | 8/1988 | De Caro | 411/392 |

FOREIGN PATENT DOCUMENTS

| 821883 | 11/1951 | Fed. Rep. of Germany | 411/389 |
|---|---|---|---|
| 78364 | 6/1955 | Netherlands | 411/392 |
| 118947 | 3/1970 | Norway | 411/392 |
| 1151128 | 5/1969 | United Kingdom | 47/41.12 |
| 1188643 | 4/1970 | United Kingdom | 47/41.12 |

Primary Examiner—Deborah L. Kyle
Assistant Examiner—Richard W. Wendtland
Attorney, Agent, or Firm—Owen, Wickersham & Erickson

[57] ABSTRACT

A connecting means for connecting frangible and/or friable aritcles comprises a generally helical spring of resilient material, one end which is adapted for insertion and engagement with a frangible or friable article, the other end of which is adapted for connection to an article to be held to the frangible or friable article which object itself may comprise a frangible or friable article. The invention has particular application to the connection of objects to floral foam or the connection of one piece of floral foam to another.

9 Claims, 3 Drawing Sheets

CONNECTING MEANS FOR FRANGIBLE AND/OR FRIABLE ARTICLES

BACKGROUND TO THE INVENTION

1. Field of the Invention

The present invention relates to a new or improved method of and means for connecting frangible and/or friable articles and is primarily, but not exclusively, concerned with the connecting of plastics foam.

Various types of plastics foam, such as polyurethane or hydrophilic rigid plastics foam, are used for floral arrangements whereby the relatively rigid structure of the foam and in the case of hydrophilic foam its water retaining properties are utilised to support and feed the cut stems of plants. Such foam will hereinafter be referred to for the sake of clarity as floral foam. Examples of hydrophilic rigid plastics floral foam are those sold under the Trade Marks "OASIS" and "STYROFOAM".

The floral foam may be cut into a variety of basic shapes and forms, e.g. rings, hearts, crosses, pads etc., on which flowers may subsequently be mounted.

Such shapes are often given a base part or container in which the floral foam may sit so as to protect the relatively fragile foam.

2. Description of the Prior Art

It is sometimes desired to elaborate on the basic shapes of floral foam commercially available by adding further pieces of floral foam thereto.

Because of the frangible and friable nature of the floral foam, the attachment of one piece of foam to another causes great difficulty and the generally accepted practice at present is to use an adhesive when the foam is dry.

Unfortunately, even after gluing the two pieces of floral foam together, if it suffers a slight knock it is likely to cause them to once again separate. Whereas a comparatively good bond can be obtained with adhesive, because of the friable nature of the floral foam a break will occur just beyond the boundaries of adhesive penetration.

It is also known to use, in conjunction with adhesive, pins for pinning the two pieces of floral foam together. However, unless the floral foam and flowers are very carefully treated, such pins tend to work loose.

SUMMARY OF THE INVENTION

It is an object of the present invention to provide a new and improved means for attaching an object to a frangible or friable article.

According to one aspect of the invention, we provide a connecting member comprising:
  (a) connection means for firmly holding a piece of floral foam,
  (b) a joining member
    (i) defining a helical path; and
    (ii) terminating in a free end remote from the connection means, said free end being capable of insertion by threading into a frangible or friable article;
  the joining member thereby enabling connection of the piece of floral foam to the frangible or friable article.

Preferably, said connecting member comprises a spring-like member of helical form and which has a substantially constant diameter and constant pitch.

Preferably, said connecting member is made from a resilient metallic material and conveniently may be made from spring steel. Alternatively, said connecting member may be made from a plastics material.

Preferably, said article comprises floral foam adapted for supporting floral arrangements. Said article may comprise straw or other frangible material adapted to support a floral arrangement.

Said connecting member may be provided with flange-like means so as to form a stop member and define a plane beyond which said member should not be inserted into said frangible or friable article.

Preferably the diameter of helix defined by the connecting member is very much larger than the cross-sectional area of the material of the member defining the helical path.

The connecting member may have a central core having a helical thread form depending therefrom having a cross-sectional ribbon-like configuration so as to present maximum surface contact with said frangible and/or friable article whilst causing minimum disturbance and destruction of the body of the frangible and/or friable article. Said object may comprise a further frangible or friable article in which case the first part is provided with an end portion capable of insert into and in threaded engagement with said further frangible or friable article. The first part of said connecting member may be connected to a cup, cage or other holding member which itself is adapted to hold any suitable object, which object may comprise a piece of hydrophilic foam, dry foam or any other substance particularly adapted for providing the support for floral arrangements.

Alternatively, the first part may provide means for supporting any other object, for example a candle, or other decoration.

It is a further object of the present invention to provide method of attaching an object to a frangible or friable article.

According to a second aspect of the invention, we provide a method of attaching an object to a frangible or friable article comprising the steps of:
  1. securing the floral foam to one end of a member defining a generally helical path;
  2. inserting the other end of that member into a frangible or friable article and causing relative rotation between the member and the frangible or friable article; and
  3. continuing with the relative rotation until engagement with the member and its frangible and friable article is such that the piece of floral foam is firmly secured to the article.

Preferably said member is of a form as aforedescribed.

The connecting means and method, the subject of the present invention, provides a highly suitable means and method for attaching objects to floral foam or pieces of floral foam to each other and obviates the need for other mechanical connections or adhesive bonding.

The provision of a spring-like member of large diameter ensures that the volume of the frangible and/or friable article providing an anchor or support for the connecting member is large and the relatively small cross-sectional area of the material used to provide the connecting member ensures minimum disturbance and destruction of the material of the frangible and/or friable article itself.

By providing a helical member of substantially constant diameter and of substantially the same pitch, insertion of the connecting member into the frangible or friable article causes a single continuous path to be formed in said floral foam but causes no other destruction, ripping, tearing of the foam itself.

Furthermore, when an object is connected to the frangible or friable article, or to frangible or friable articles connected to each other, relative rotation between the articles and connecting member occurs until the articles come into abutment with each other or to abutment with a limit member secured to the connecting member, further rotation causing a slight stretching of the resilient connecting member so as to provide a force pulling the two frangible articles together.

The connecting means of the present invention provides further substantial advantages in its application to floral foam.

If it is desired to connect together two pieces of floral foam then the positioning of one piece relative to the other may be critical and if secured as in the past with adhesive it cannot be changed unless the bond is broken. The connection means of the present invention permits the two pieces of foam to be completely separated and repositioned and furthermore also allows for relative repositioning, since if the connecting means is of a resilient nature, further roation is possible relative to one of the articles causing re-alignment of the two pieces of foam due to resilient deformation of the spring.

BRIEF DESCRIPTION OF THE DRAWINGS

The present invention will now be described in more detail by way of example only with reference to the accompanying drawings, wherein.

DESCRIPTION OF THE PREFERRED EMBODIMENTS

Figure 1:
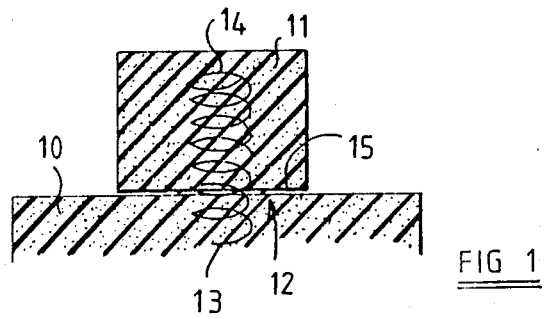
FIG. 1 is an illustration of one embodiment of connecting means.

Referring first to FIG. 1, a frangible and/or friable article is shown at 10 to which has been secured a further frangible and/or friable article 11 by means of a connecting member gererally indicated at 12. The connecting member in the embodiment shown comprises a helical spring which may be made from spring steel and which has one end 13 secured into the frangible and/or friable article 10, and the other end 14 engaged in the frangible and/or friable article 11.

If the articles 10 and 11 are of a fairly soft nature, such as is the case with floral foam, the connecting member 12 may be easily screwed into each of the articles.

A flange-like stop member 15 may be provided if desired, the flange member 15 being secured to the connecting member 12 approximately mid-way between the ends, the stop member preventing an unnecessary amount of the connecting member 12 being inserted into either one of the articles so as to ensure that there is enough of the connecting member to properly engage with the other of the articles.

Figure 2:
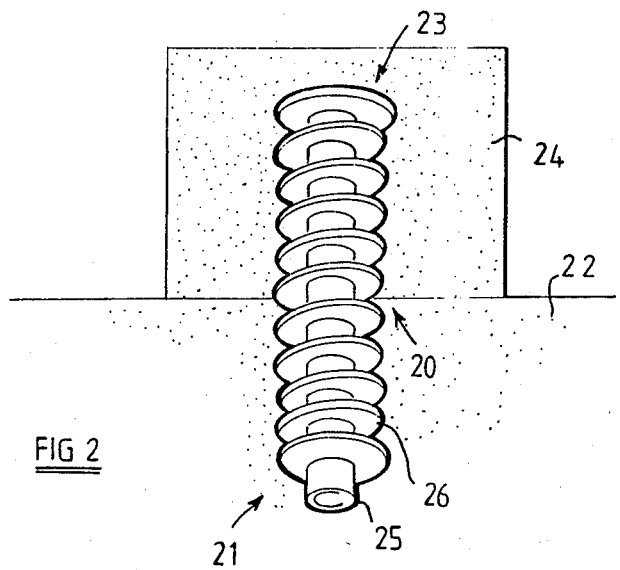
FIG. 2 is an illustration of a second embodiment of connecting means.

Referring now to FIG. 2, an alternative connecting member is shown, the connecting member generally indicated at 20 has one end 21 secured into a frangible or friable such as a piece of floral foam 22 and the other end 23 secured into a piece of floral foam 24.

The connecting member 20 comprises a central core 25 which is hollow from which depends a helical thread form 26, the diameter of the helix being substantially constant and the pitch of the helix also being substantially constant so as not to cause undue disturbance to the material of the floral foam.

The connecting member 20 may be made from any suitable material and may, for example, comprise an injection molding in plastics material and presents considerable surface area contact with each piece of foam 22 and 24 while having a helical thread form 26 of ribbon-like cross-section so as to cause maximum surface contact with the foam with minimum disturbance of the material of the foam.

In the embodiment shown, there is no flange-like member as shown at 15 in FIG. 1. However, if desired, a flange may be provided.

Figure 3:
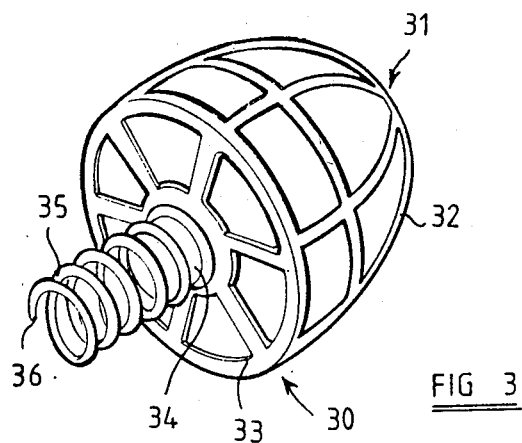
FIG. 3 is an illustration of a third embodiment of connecting means.

Referring now to FIG. 3, a connecting member 30 is shown, the embodiment of connecting member 30 being utilised to connect a piece of floral foam to a larger piece of floral foam.

The connecting member 30 comprises a first part 31 in the form of a cage-like construction, the cage-like construction 31 having a top part 32 which is detachably mounted on a base part 33.

Separation of the top part 32 from the base 33 allows the cage 31 to be opened and a piece of foam may be inserted therein, the cage 31 may then be closed to trap the foam inside.

The base 33 of the cage comprises a spigot 34 to which is secured a second part 35 of the connecting member. The second part 35 comprises a generally helical spring-like member which in the way aforedescribed may be secured into a piece of floral foam by inserting the end 36 into the floral foam and rotating the whole of the connecting member 30 about the axis of the helical spring 35.

Preferably the spigot 34 is hollow which enables the stem of a flower, for example, to pass through the floral foam inside the cage 31 and into the floral foam to which the connecting member 30 is connected.

The helical spring 35 is preferably connected to the spigot in a manner whereby undesired rotation between the two is prevented and the spigot or base 33 of the cage 31 may be provided with a groove into which a coil or part of a coil of the spring locates, said groove being provided with a projection or other abutment surface adapted to contact the end of the spring to prevent rotation, at least in one direction.

Further means may be provided to secure the spring onto the spigot and, for example, a hollow plug may be inserted in the internal bore of the spigot, the plug being of a tapered nature to expand the spigot and so increase the force acting between the spring and the spigot to hold the two parts together.

Whereas the second part 35 has been shown in the form of a helical spring, it may comprise for example a connecting member as shown in FIG. 2 or any other connecting member, at least a part of which defines a generally helical path.

Figure 4:
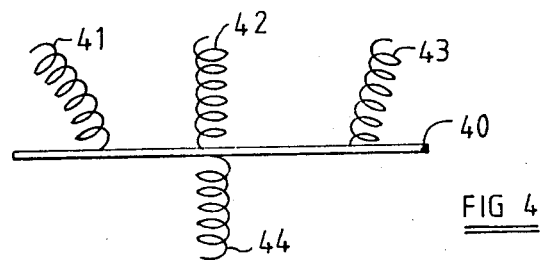
FIG. 4 is an illustration of a fourth embodiment of connecting means.

Referring now to FIG. 4, a still further connecting member is shown and comprises what may be a circular or annular like base 40 from which extends three generally helical spring-like connecting members 41, 42 and 43 in one direction and a fourth generally helical spring-like member 44 which extends from the base part 40 in the opposite direction.

The connecting member as shown in FIG. 4 enables the attachment of, for example, three further pieces of floral foam to a base by attaching each of the three further pieces to the connecting members 41, 42 and 43 and then all three are connected to the base by inserting the spring 44 into the base and causing relative rotation of the whole connecting member about the helical axis of spring 44.

If the pieces of foam to be connected are fairly substantial, then the size of the spring 44 may be large compared with the size of the springs 41 to 43.

The base part 40 may be of web-like form so as to provide access for the insertion of flowers and the like into the upper surface of the base of floral foam.

Figure 5:
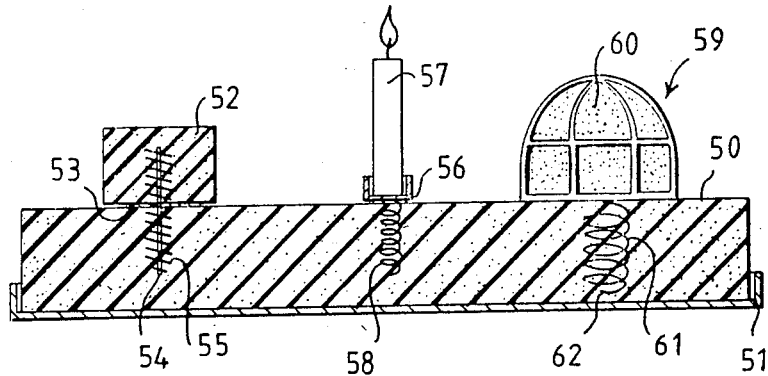
FIG. 5 is an illustration of three different embodiments of connecting means in use.

Referring now to FIG. 5, a piece of base floral foam 50 is provided with a substantially rigid support tray 51 and has attached thereto a first small piece of foam 52 connected by a connecting member 53, similar to the connecting member shown in FIG. 2.

The connecting member 53 has a slender central spine 54 from which depends a relatively large diameter helical thread form 55. The spine 54 being of fairly slender form may be solid.

A second connecting member comprises a cup 56 for supporting an object such as a candle 57, the cup 56 being secured to a spring-like member 58 which may be secured into the base foam 50.

The cup 56 may be secured to the spring 58 by, for example, an injection moulding process whereby the upper end of the spring 58 is moulded into the cup 56 or alternatively the cup 56 may be provided with a flange, spigot or other connecting means for engagement by the spring 58.

The third connecting member 59 comprises a cage-like member as shown in FIG. 3 in which is secured a piece of floral foam 60.

The end 62 of spring 61 is then inserted into the base foam 50 and the whole cage rotated about the axis of helical spring 61 so that the whole of the spring 61 is inserted into the base foam 50 thereby firmly securing the cage and entrapped foam 60 to the base foam 50.

Figure 6:
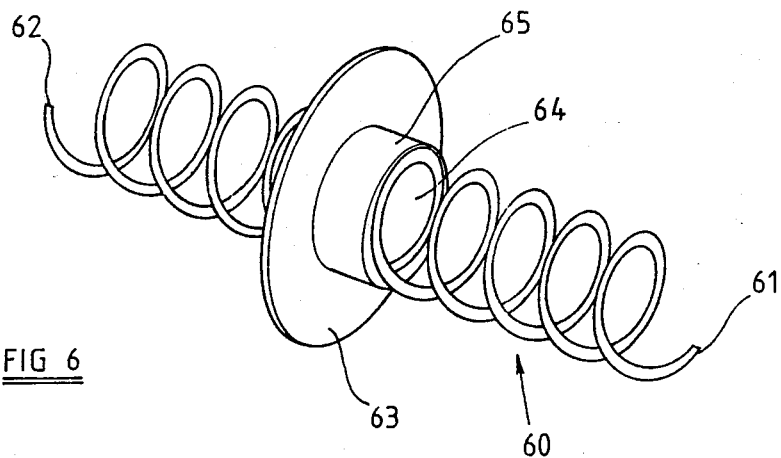
FIG. 6 is an illustration of a further embodiment of connecting means securing a piece of floral foam to a base part.

Referring now to FIG. 6, an embodiment of connecting means is shown and comprises a helical spring 60 having one end 61 inserted into one article and an opposite end 62 for securing into the other article.

A flange-like stop member 63 is provided which presents over-insertion of either end of the helical spring 60 into any one of the articles.

The helical spring may be secured to the flange-like stop member 63 in any suitable manner, for example by insertion into the bore 64 of a spigot 65 and engagement therewith either by friction or adhesive, or for example the flange 63 may be moulded onto the helical spring 60.

Figure 7:
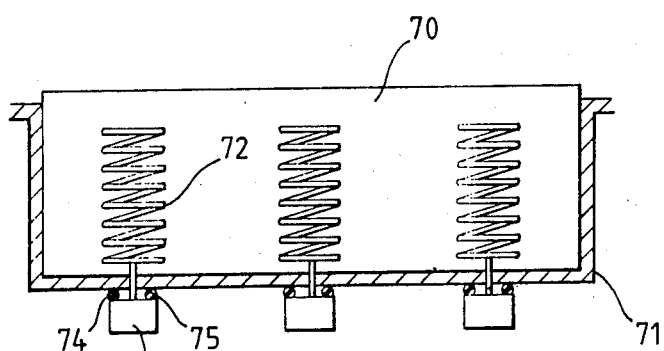
FIG. 7 is an illustration of an embodiment of connecting means connecting two pieces of floral foam together.

Referring now to FIG. 7, a piece of floral foam 70 is illustrated mounted in a base 71 which may be made from a fairly rigid plastics material. In order to secure the foam 70 into the base 71 a plurality of connecting means are provided, each connecting means comprising a helical spring-like part 72 to which is secured a headed part 73.

The foam 70 is placed in position in the base 71 and a connecting member is inserted through aperture 74 and the head part 73 is then rotated so that the helical spring-like part 72 firmly engages the foam 70.

Continued rotation of the head part 73 will cause the head part 73 to abut the base 71 and hence firmly secure the foam 70 into the base.

The head part 73 may be provided with an integral sealing member 75 or alternatively the sealing member may be provided on the base 71, or as a separate part.

The sealing member 75 not only provides a substantially watertight seal but enhances frictional engagement between the head part 73 and the base 71 which has a tendency to prevent undesired release of the connecting member.

As an alternative to a sealing member, where a watertight seal is not necessary or possibly in addition to said sealing member, the base 71 may be provided with protrusions or indentations and the underside of head part 73 may also be provided with projections and/or indentations, contact between said projections and/or indentations of the head 73 and the base 71 having a ratchet-like effect to prevent or hinder rotation in one rotational direction and hence prevent undesired release.

The heads 73 of the connecting members may conveniently comprise feet for the base 71, foam 70 construction and may be provided with a rounded or soft lower surface so as to protect the surface of, for example, a table on which the article is to be placed.

It is further envisaged that the head 73 may be made of rubber or rubber-like material providing not only a seal relative to the base 71 and frictional engagement therewith to prevent undesired release, but also a "cushioned" foot for the article as a whole.

Figure 8:
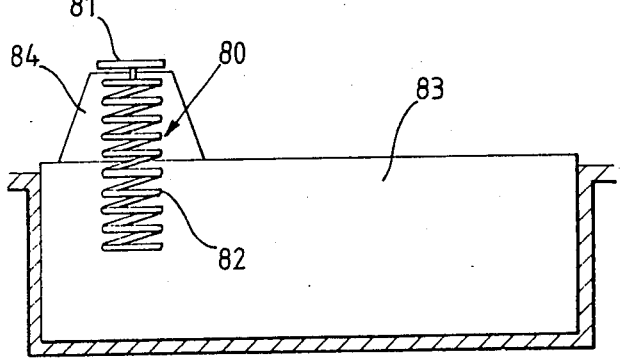
FIG. 8 is an illustration of an embodiment of fastening means for connecting two pieces of foam together.

Referring now to FIG. 8, a further embodiment of connecting member similar to the connecting member shown in FIG. 7 is provided, the connecting member 80 having a headed part 81 and a helical part 82, the connecting member 80 connecting together two pieces of foam 83 and 84. The connecting member 80 secures together the pieces of foam 83 and 84 by being inserted completely through the piece of foam 84 and into the foam 83 until the underside of head part 81 contacts the upper surface of the piece of foam 84.

It is further envisaged that the head part 81 may be provided with means for connection to an object, for example a candle holder, or may be provided with some other ornamentation or an object having a functional nature.

The head part 81 may be fairly flat and web-like construction having holes therein so as to permit of the insertion of flowers through the head 81 so as to totally hide the head part 81 with floral arrangements if so desired.

It will be appreciated that the embodiments shown above are merely examples of some of the forms to which the connecting means of the present invention may take.

It has been found preferable that the diameter of the helical thread form is substantially constant and indeed the pitch is also constant so as to cause minimum disturbance to the material of the floral foam.

It is envisaged however that non-constant diameter helixes may also be quite satisfactory and furthermore, particularly where the connecting means is of a resilient nature, it may not be necessary for the pitch of the helix to be constant since some resilient deformation of the helix may occur during insertion into the foam and so cause the helical thread form to follow its initial path into the foam, thus avoiding unnecessary damage to the body of the foam.

I claim:

1. An assembly comprising
   a cage having a base and an enclosure member with openings therethrough and detachably secured to said base, said base having a spigot depending therefrom,
   a first floral foam member contained within said enclosure member,
   a helical member having one end snugly engaging said spigot and a portion defining a helical path in a lower end remote from said base, said helical path portion being capable of insertion into a second floral foam member.

2. The assembly of claim 1 where said helical member has
   connection means for firmly holding said floral foam member and defines
   a joining portion which has a helical path remote from said connection member and terminating in a free end capable of insertion by threading into a frangible or friable article and thereby enabling connection of said piece of floral foam to said article.

3. An assembly according to claim 2 wherein said article is a decorative article.

4. The assembly according to claim 2 wherein said joining portion comprises a spring-like member of helical form which has a substantially constant diameter and pitch.

5. An assembly according to claim 4 wherein said joining portion is made from a resilient metallic material.

6. An assembly according to claim 2 wherein said joining portion is made from a plastics material.

7. An assembly according to claim 6 wherein the joining portion has a central core having a helical thread form depending therefrom, the cross-sectional configuration of said thread form being of ribbon-like configuration so as to present maximum surface contact with a frangible and/or friable article whilst causing minimum disturbance and destruction of the body of the frangible and/or friable article.

8. An assembly according to claim 2 wherein said joining portion is provided with a flange-like means so as to form a stop member and define a plane beyond which said member cannot be inserted into said frangible or friable article.

9. An assembly according to claim 2 wherein the diameter of the helical spring-like member is very much larger than the cross-sectional area of the material of the member defining the helical path.

* * * * *